(12) United States Patent
Budyta et al.

(10) Patent No.: US 10,560,205 B2
(45) Date of Patent: Feb. 11, 2020

(54) DETECTING SATELLITE RADIO RECEPTION INTERFERENCE

(71) Applicant: GM GLOBAL TECHNOLOGY OPERATIONS LLC, Detroit, MI (US)

(72) Inventors: Alan T. Budyta, Sterling Heights, MI (US); Timothy J. Talty, Beverly Hills, MI (US); Duane S. Carper, Davison, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 15/464,155

(22) Filed: Mar. 20, 2017

(65) Prior Publication Data

US 2018/0269999 A1  Sep. 20, 2018

(51) Int. Cl.
| | |
|---|---|
| *H04L 12/58* | (2006.01) |
| *H04B 17/345* | (2015.01) |
| *H04B 7/185* | (2006.01) |
| *H04W 4/04* | (2009.01) |

(52) U.S. Cl.
CPC ....... *H04B 17/345* (2015.01); *H04B 7/18517* (2013.01); *H04W 4/046* (2013.01)

(58) Field of Classification Search
None
See application file for complete search history.

(56) References Cited

U.S. PATENT DOCUMENTS

| | | | | |
|---|---|---|---|---|
| 2004/0203461 | A1* | 10/2004 | Hay | G01S 19/21 455/67.13 |
| 2007/0049240 | A1* | 3/2007 | King, Jr. | G01S 19/14 455/345 |
| 2009/0247073 | A1* | 10/2009 | Videtich | H04B 7/18563 455/12.1 |

* cited by examiner

*Primary Examiner* — Zewdu A Beyen
(74) *Attorney, Agent, or Firm* — Reising Ethington P.C.; David Willoughby

(57) ABSTRACT

A system and method of detecting satellite radio broadcast interference at a vehicle includes receiving a satellite radio broadcast at the vehicle, determining that the satellite radio broadcast has been interfered with by the existence of a cellular communications signal, and transmitting a data message identifying the location of the interference to a remote facility.

8 Claims, 3 Drawing Sheets

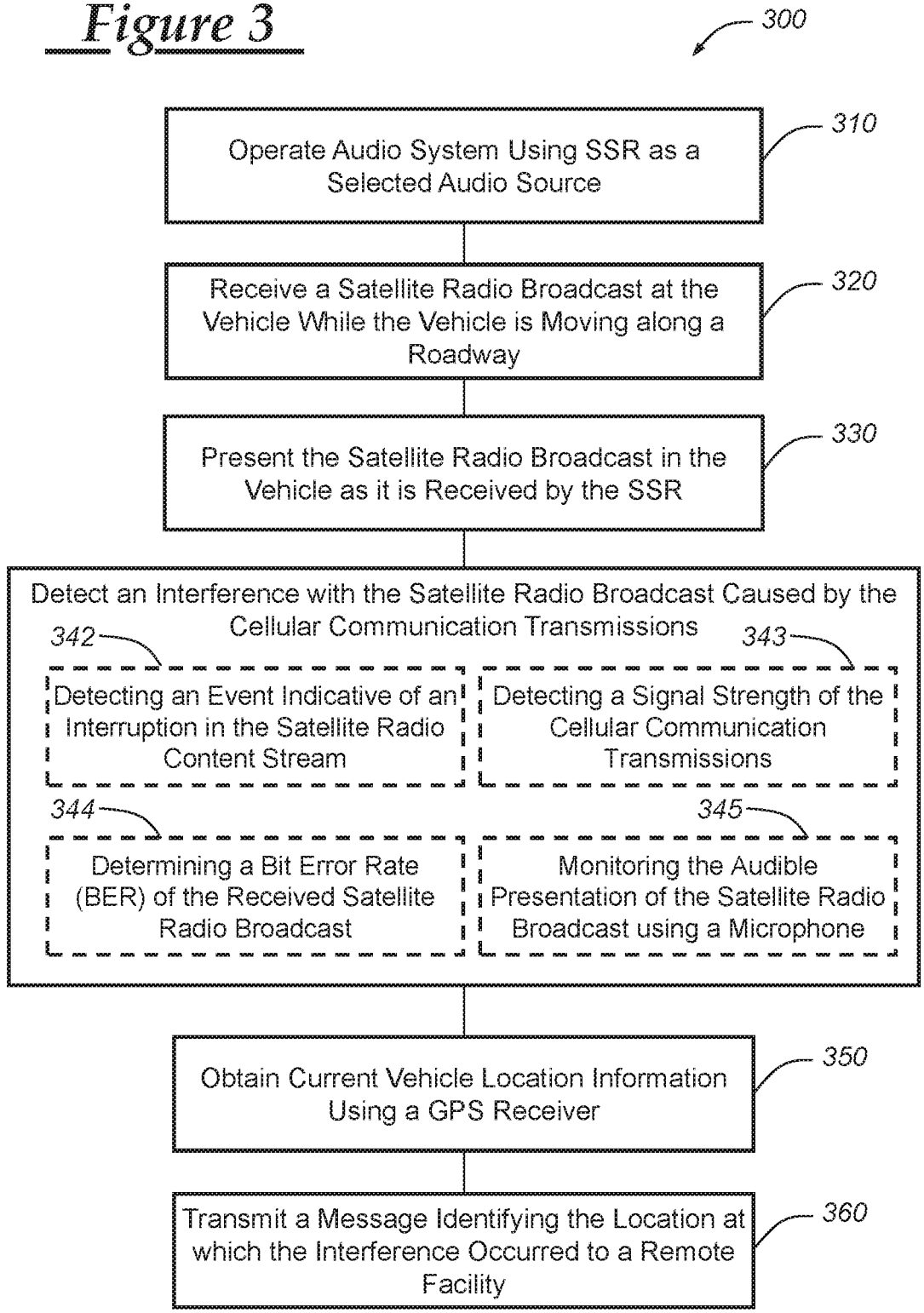

DETECTING SATELLITE RADIO RECEPTION INTERFERENCE

INTRODUCTION

The present invention relates to vehicles and, more particularly, to detecting interference with satellite radio reception at a vehicle. Vehicles often include functionality that allows the receipt of satellite radio broadcasts at the vehicle. Through its audio system, the vehicle can audibly play the satellite radio broadcasts for vehicle occupants. However, sometimes the playback of satellite radio broadcast in the vehicle by the audio system can be periodically interrupted. Vehicle owners who experience these interruptions may take their vehicles to vehicle service facilities for diagnosis and repair. However, the cause of the satellite radio broadcast interruption may not be caused by malfunctions in the hardware or software of the vehicle. Detecting occurrences of satellite radio broadcast interruptions can be helpful for diagnosing the cause of these interruptions.

SUMMARY

In accordance with an aspect of the invention, there is provided a method of detecting satellite radio broadcast interference at a vehicle. The method includes the steps of (a) receiving a satellite radio broadcast at the vehicle, (b) determining that the satellite radio broadcast has been interfered with by the existence of a cellular communications signal, and (c) transmitting a data message identifying the location of the interference to a remote facility.

The method may be carried out using one or more of the following additional steps or features in any technically feasible combination.

- The cellular communications signal is transmitted within a frequency band used by a cellular sub classification, wherein the sub classification includes Wireless Communication Service (WCS), Advanced Wireless Service (AWS), or Personal Communications Service (PCS). Also, the satellite radio broadcast may be one that is wirelessly transmitted within a 2.3 GHz frequency band.
- Step (b) further comprises detecting a signal strength of the cellular communications signal and determining that the satellite radio broadcast has been interfered with based on the signal strength.
- Step (b) further comprises the steps of (b1) determining a bit error rate (BER) of the satellite radio broadcast and (b2) determining that the satellite radio broadcast has been interfered with based on the BER.
- Step (b2) further comprises determining that the BER of the satellite radio broadcast is above a predetermined threshold for longer than a determined time.
- Step (b) further comprises the steps of (b1) monitoring an audible presentation of the satellite radio broadcast within the vehicle via a microphone and (b2) detecting an interruption in the audible presentation.
- Step (b) further comprises determining which satellite radio channel was selected when the satellite radio broadcast was interfered with, and step (c) further comprises including an identification of the selected channel in the data message.
- Step (d) further comprises obtaining the vehicle's current location as an indication of the location of the interference, and wirelessly transmitting the current location to the remote server.

In accordance with another aspect of the invention, there is provided a method of detecting satellite radio broadcast interference at a vehicle. The method includes the steps of:
- (a) operating an audio system installed in the vehicle using a satellite radio receiver as a selected audio source, wherein the audio system includes the satellite radio receiver and is installed in the vehicle as a portion of vehicle electronics that are used to carry out vehicle functions including operation of the vehicle to move along roads;
- (b) receiving a satellite radio broadcast at the vehicle via the satellite radio receiver while the vehicle is moving along a roadway;
- (c) audibly presenting the satellite radio broadcast in the vehicle via the audio system as it is received by the satellite radio receiver;
- (d) detecting an interference with the satellite radio broadcast caused by cellular communication transmissions, wherein the interference interrupts or degrades the audible presentation of the satellite radio broadcast in the vehicle;
- (e) in response to step (d), carrying out the following steps (f) and (g):
- (f) obtaining location information at the vehicle using a global positioning system (GPS) receiver installed onboard the vehicle as a part of the vehicle electronics, wherein the obtained location information is representative of the location at which the interference occurred; and
- (g) wirelessly transmitting a message identifying the location at which the interference occurred to a remote facility via a vehicle telematics unit that is installed in the vehicle as a part of the vehicle electronics.

The audio system, GPS receiver, and telematics unit are separate vehicle system modules, and wherein the audio system includes the satellite radio receiver and an audio player that is either integrated with or operably connected to the satellite radio receiver. The satellite radio broadcast received by the satellite radio receiver is outputted by the satellite radio receiver as a satellite radio content stream for audible presentation during step (c) by the audio player via one or more speakers in the vehicle; and Step (d) further comprises determining that the interference occurred at least in part by carrying out one or more of the following steps (d1) to (d4):
- (d1) detecting an event indicative of an interruption in the satellite radio content stream that contains the satellite radio broadcast outputted by the satellite radio receiver;
- (d2) detecting a signal strength of the cellular communication transmissions and determining that the interference occurred at least in part based on the signal strength;
- (d3) determining a bit error rate (BER) of the received satellite radio broadcast and determining that the interference occurred at least in part based on the BER;
- (d4) monitoring the audible presentation of the satellite radio broadcast within the vehicle via a microphone and detecting an interruption in the audible presentation based on an analysis of the monitored audible presentation.

The method of the preceding paragraph may be carried out using one or more of the following additional steps or features in any technically feasible combination.

The cellular communication transmissions are sent within a frequency band used by a cellular sub classification, wherein the sub classification includes Wireless Communication Service (WCS), Advanced Wireless Service (AWS), or Personal Communications Service (PCS), and wherein the satellite radio broadcast is wirelessly transmitted within a 2.3 GHz frequency band.

Step (d3) further comprises determining that the BER of the satellite radio broadcast is above a predetermined threshold for longer than a determined time. In some embodiments, the predetermined threshold may be at least 5% and the determined time may be no longer than 10 seconds.

Step (g) further comprises determining a time and day at which the interference occurred and including the time and day in the message.

Step (d) further comprises determining which satellite radio channel was selected when the interference occurred, and step (g) further comprises including an identification of the selected channel in the message.

In accordance with yet another aspect of the invention, there is provided a method of detecting satellite radio broadcast interference at a vehicle. The method includes the steps of (a) receiving a satellite radio broadcast at the vehicle, (b) audibly playing the satellite radio broadcast at the vehicle via an audio system, (c) determining the bit error rate (BER) of the satellite radio broadcast received at the vehicle, (d) detecting that the BER is above a predetermined threshold and, in response thereto: (e) obtaining the vehicle's current location and (f) transmitting to a remote facility a message identifying the current location and indicating that there is interference with reception of the satellite radio broadcast.

The method of the preceding paragraph may be carried out using one or more of the following additional steps or features in any technically feasible combination.

The satellite radio broadcast is wirelessly transmitted within a 2.3 GHz frequency band.

Step (d) further comprises determining that the BER of the satellite radio broadcast is above the predetermined threshold for longer than a determined time.

Step (f) further comprises determining a time and day at which the interference occurred and including the time and day in the message.

The method may further comprise, in response to detecting that the BER is above the predetermined threshold, determining which satellite radio channel is currently selected. Step (f) may further comprise including an identification of the selected channel in the message.

BRIEF DESCRIPTION OF THE DRAWINGS

One or more embodiments of the invention will hereinafter be described in conjunction with the appended drawings, wherein like designations denote like elements, and wherein:

FIG. 3 is a flow chart depicting an example implementation of the method of FIG. 2.

DETAILED DESCRIPTION

Figure 1:
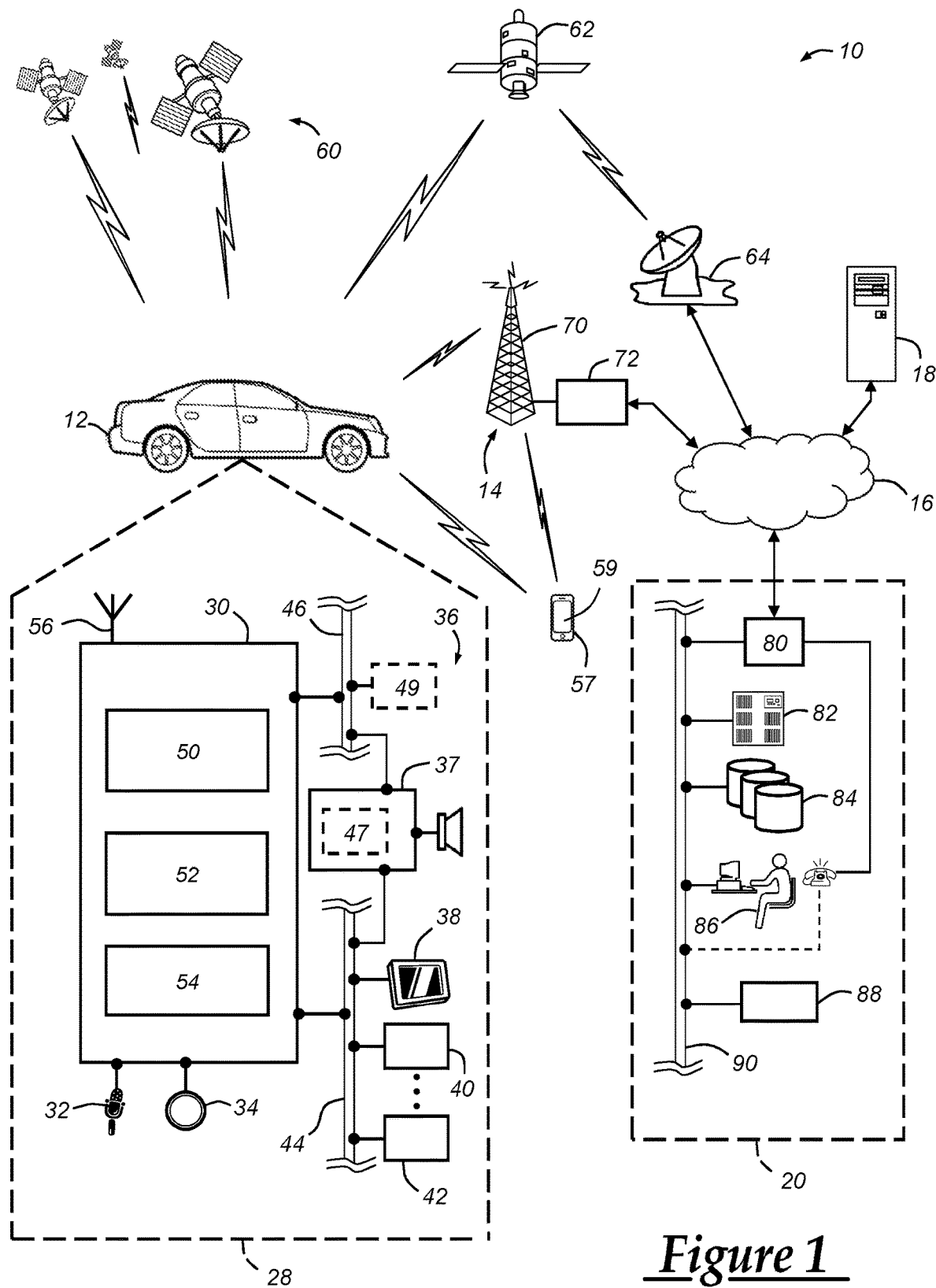
FIG. 1 is a block diagram depicting an embodiment of a communications system that is capable of utilizing the method disclosed herein.

The system and method described below involves detecting satellite radio broadcast interference at a vehicle. These broadcasts come from one or more satellites that orbit the earth and broadcast digital audio content that is selectively received by satellite radio receivers. As noted above, vehicles often include a satellite radio receiver (SRR) that receives the satellite radio broadcasts and generating an audio signal that is used to audibly play the contents of the satellite radio broadcast in the vehicle. Satellite Digital Audio Radio Service (SDARS) transmits satellite radio broadcasts using a 2.3 GHz frequency spectrum. However, some cellular telephone protocols use a frequency spectrum that is very close to this frequency spectrum. For example, Wireless Communication Service (WCS), Advanced Wireless Service (AWS), and Personal Communications Service (PCS) each occupy frequency spectrums that are close to the frequency spectrum used by the satellite radio broadcast. The relative proximity of the satellite radio broadcast frequency spectrum(s) to the frequency spectrum(s) occupied by cellular telephone protocols will be discussed below in more detail.

The close proximity of the satellite radio broadcast frequency spectrum with frequency spectrums used by certain cellular telephone providers can cause interference with the satellite radio broadcasts. The signals broadcast by cell towers using the cellular telephone frequency spectrums can overpower the satellite radio broadcasts such that the satellite radio receiver receiving and audibly playing the broadcast will go silent and stop playing the audible content of the broadcast. The vehicle owner or occupant who experiences this may look around the vehicle and not notice any obvious physical impediments to receiving the satellite broadcast, such as an underground concrete parking structure, and mistakenly assume that a vehicle software or hardware malfunction exists. This mistake could lead the vehicle owner to bring the vehicle to a service facility where hardware and software is unnecessarily replaced.

The system and method presented herein detects interference with the satellite radio broadcast at the vehicle and determines the location of that interference. The vehicle can then wirelessly transmit the location of the interference and, optionally, other information about the interference, to a remote facility where it can identify areas reporting a significant amount of satellite radio broadcast interference. Vehicle service facilities can access a database created and/or maintained by the remote facility that identifies these areas where interference exists. When a vehicle service facility receives a complaint relating to satellite radio broadcast reception, the facility can access vehicle locations generated by a particular vehicle and cross reference those locations with areas identified in the database as having significant amounts of satellite radio broadcast interference. Based on a discovery that the particular vehicle has traveled to an area where significant amounts of satellite radio broadcast interference exist, the vehicle service facility can decide not to replace hardware/software in the vehicle. In addition, the remote facility can identify cell towers located in areas where significant amounts of satellite radio broadcast interference exists and determine whether the equipment used by cellular carriers in those areas are malfunctioning.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS receiver (module) 40 as well as a number of other vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth™, or near field communication (NFC). When used for packet-switched data communication such as TCP/IP, the telematics unit can be configured with a static IP address or can be set up to automatically receive an assigned IP address from another device on the network such as a router or from a network address server.

One of the networked devices that can communicate with the telematics unit 30 is a wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface. The smart phone 57 can also include a GPS module capable of receiving GPS satellite signals and generating GPS coordinates based on those signals. The smart phone 57 also includes one or more microprocessors that execute machine code to generate logical output. Examples of the smart phone 57 include the iPhone manufactured by Apple and the Galaxy manufactured by Samsung, as well as others.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the telematics unit 30, audio system 36, and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Audio system 36 comprises one or more VSMs installed in the vehicle as a portion of the vehicle electronics 28. It provides audio to vehicle occupants within the interior of the vehicle and in some embodiments may be implemented as a part of an infotainment module or infotainment head unit (IHU) that may include visual display 38 and/or other functionality such as providing Bluetooth™, Wi-Fi, or other wireless connections to occupant's devices such as smart phone 57. In the illustrated embodiment, audio system 36 includes at least an audio player 37 and satellite radio receiver (SRR) which can be an SRR 47 incorporated into the audio player 37 or an SRR 49 implemented as a separate VSM that is operably connected to the audio player 37. In either implementation, an SDARS or other satellite radio broadcast received by SRR 47 or 49 is sent from the SRR as a satellite radio content stream to be audibly presented in the vehicle by the audio player 37 using its speaker(s). Where the SRR 47 is integrated into the audio player 37, this can be done internally within that VSM. Where the SRR 49 is a separate module, the content stream may be sent in any suitable manner, such as via the entertainment bus 46 if the vehicle is so equipped.

In the embodiment shown, audio system 36 is operatively coupled to both vehicle bus 44 and entertainment bus 46 and provide AM, FM and satellite radio, CD, DVD and other multimedia functionality. For example, audio player 37 includes an amplifier and one or more speakers along with at least an audio signal input, but may also include a tuner for receipt of terrestrial broadcast radio stations, an optical media player, etc. The audio system 36 and/or each component thereof can include computer processing functionality in the form of a microprocessor, memory, a bus, and an input/output device. The computer processing functionality can be integrated in one package or can be separately located and linked via the bus.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1×EV-DO) or GSM/GPRS (e.g., 4G LTE). The wireless carrier system 14 can also implement 4G LTE ("LTE") using different sub classifications of LTE. These sub classifications include Wireless Communication Service (WCS), Advanced Wireless Service (AWS), and Personal Communications Service (PCS). The frequency bands occupied by these sub classifications have been established by the Federal Communications Commission (FCC) and can be presently found on the website maintained by the FCC as is known to those skilled in the art. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
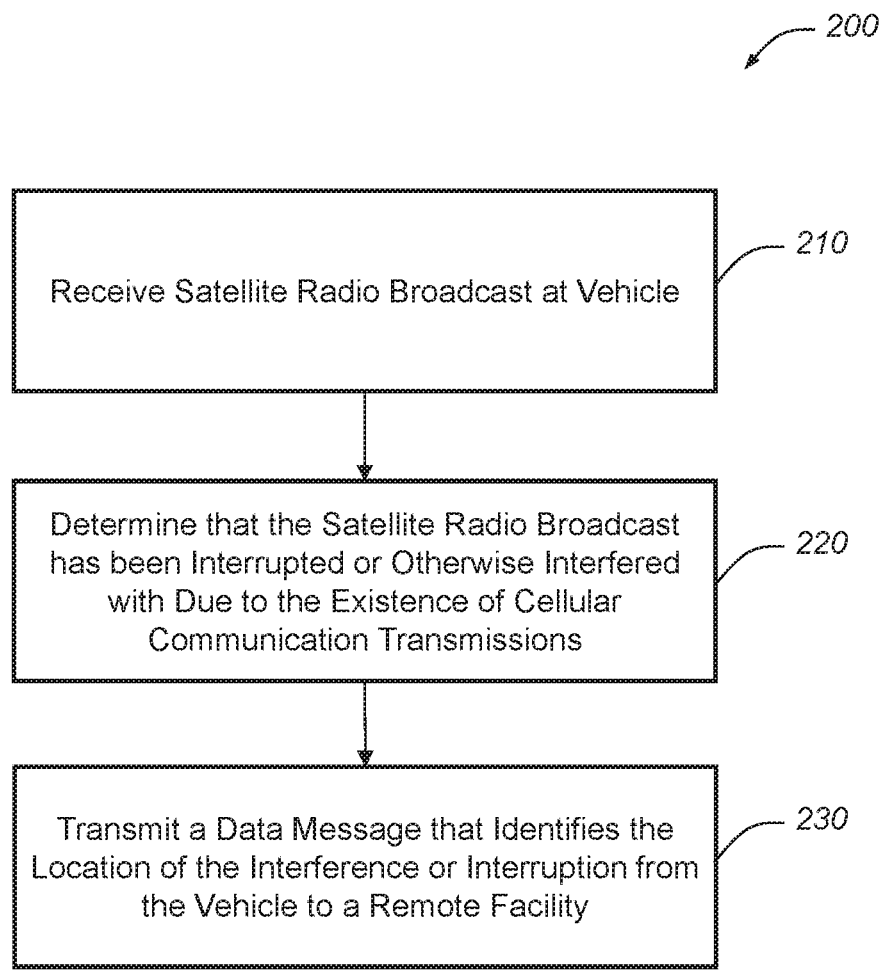
FIG. 2 is a flow chart depicting an embodiment of a method of detecting satellite radio broadcast interference at a vehicle.

Turning now to FIG. 2, there is a method (200) of detecting satellite radio broadcast interference at the vehicle 12. The method 200 generally involves detecting interference with a satellite radio broadcast and reporting that interference and its location to a remote server where it may be analyzed in conjunction with other such data. The method begins at step 210 by receiving a satellite radio broadcast at the vehicle 12. The following embodiment will be described with respect to North American satellite radio broadcasts transmitted over the 2.3 GHz frequency band and wireless cellular telephone communications transmitted using the WCS sub classification of the LTE cellular protocol. However, it should be readily understood by those skilled in the art that the methods disclosed here are also applicable to other wireless cellular telephone protocols and their frequency spectrums, such as PCS and AWS sub classifications.

The vehicle 12 can receive the satellite radio broadcast from satellite 62 orbiting the earth in space. The frequency band used by the satellite 62 for transmitting satellite radio broadcasts can range from 2.3200-2.3450 GHz. Some of this frequency spectrum is occupied by terrestrial-based repeaters (not shown) that receive the satellite radio broadcasts from the satellite 62 and transmit the broadcasts from land-based antennas to satellite radio receivers. These terrestrial-based repeaters use frequency bands that include 2.32454-2.32796 GHz and 2.336225-2.341285 GHz. Wireless cellular communications using WCS is carried out over two frequency bands ranging from 2.305-2.320 GHz and 2.345-2.360 GHz, respectively. In this embodiment the WCS frequency bands are directly adjacent to the satellite radio broadcast frequency bands such that they have common frequency band endpoints at 2.320 GHz and 2.345 GHz. The vehicle 12 can receive the satellite radio broadcast via a suitable antenna and, where the satellite radio receiver (SRR) 47/49 is chosen by the user as the selected audio source, the SRR can provide the broadcast as a satellite radio content stream for audible presentation within the vehicle 12 by the audio player 37. The method 200 proceeds to step 220.

At step 220, it is determined that the satellite radio broadcast has been interrupted or otherwise interfered with due to the existence of a cellular communication transmissions, such as a cellular communications signal from the smart phone 57 or a nearby cell tower. For example, cell tower 70 can broadcast downlink wireless signals to wireless devices capable of receiving the signals within the WCS frequency band. The vehicle telematics unit 30 may not operate using the WCS frequency band due to governmental regulations that prevent such operation. However, other wireless devices having cellular communications functionality, such as the smart phone 57, may receive broadcasts from the cell tower 70, such as a downlink signal, sent within the cellular WCS frequency band. The smart phone 57 may also transmit wireless signals within the WCS cellular frequency band to carry out cellular calls using the WCS sub classification. These signals can be referred to as uplink signals. Either of these communication transmissions can interfere with receipt of the satellite radio broadcast. The signals wirelessly transmitted from the cell tower 70 in accordance with WCS can attenuate or otherwise interfere with the satellite radio broadcast signal, which may have a relatively lower power than that of the cell tower 70. It is also possible for the smart phone 57 broadcasting a wireless signal in the WCS cellular frequency band to interfere with reception of the satellite radio broadcast if the smart phone 57 is close enough to the antenna 56. For example, the power of the signal transmitted by the cell tower 70 may be −40 dBM whereas the power of the signal carrying the satellite radio broadcast may be −70 dBM.

When the cellular communications signal overpowers, corrupts, or otherwise interferes with the satellite radio broadcast, the presentation of the received satellite radio broadcast by the audio system 36 may be interrupted, and the vehicle occupant therefore experiences a lack of sound from the audio system 36 as if it had been momentarily muted. Any of a number of different techniques for determining that this interference occurred may be used alone or in conjunction with each other. Some such techniques involve analysis of the received satellite radio broadcast, either by the SRR itself, or by analysis of the satellite radio content stream outputted by the SRR. Other techniques involve detection/analysis of the interfering cellular communication transmissions themselves, while yet other techniques monitor for an interruption (muting) of the audible presentation of the satellite radio broadcast in the vehicle. Specific examples of these techniques are discussed below as they would be implemented in real time using the vehicle electronics as the vehicle is traveling along the roadway.

One method of detecting interference with the satellite radio broadcast caused by cellular communication transmissions is to detect an event indicative of an interruption in the satellite radio content stream outputted by the SRR. Depending upon the particular implementation of SRR in the audio system 36, this content stream may comprises digital audio data (packetized or otherwise) or an analog audio signal such as a high impedance or line level audio output from the SRR. And as used herein, "stream" and "streaming" do not refer to a particular technology, protocol, or signal format, but refer to transmission of content in a manner that allows a particular item of content (e.g., a complete song or podcast) to be presented as it is received without having to receive the entire item (song or podcast) before presentation is begun.

Detection of the interruption in the satellite radio content stream may be done internally within the SRR or by analyzing the outputted content stream itself, either by the audio player 37 or some other portion of audio system 36. The interruption may be determined by detecting a break in the stream, such as by monitoring the audio signal level or the energy contained in the signal through use of a fast Fourier Transform (FFT) and then comparing the results to a minimum threshold below which a lack of sound may be inferred. Such techniques and the programming of audio system 36 needed to carry them out will be known to those skilled in the art.

Another method of determining that the satellite radio broadcast has been interfered with by cellular communication transmissions is to determine the bit error rate (BER) of the satellite radio broadcast received at the vehicle 12. As the BER of the received satellite radio broadcast increases, so too does the likelihood that the broadcast is being interfered with by a cellular signal. The vehicle 12 can determine that the BER of the satellite radio broadcast has increased above an acceptable limit. When the BER is detected as being above a predetermined threshold for longer than a determined amount of time, the audio system 36 can set a flag that indicates that cellular signal interference with the satellite radio broadcast exists. Various thresholds for the BER and the determined amount of time can be established. In one implementation, the BER threshold can be 5% and if the audio system 36 detects any BER above that threshold, or detects a BER above that threshold for longer than determined time (e.g., 5 or 10 seconds), the flag can be set indicating interference that should be reported. The interference may then be communicated (step 230) either immediately or later based on the set flag when a more convenient, economical, or otherwise suitable wireless communication opportunity becomes available to send the message. Techniques for calculating the BER of a digital signal are known to those skilled in the art, and the implementation of that within the audio system 36 by suitable programming of an electronic processor will be apparent to those skilled in the art.

Interference by nearby cellular communication transmissions can also be detected based on analysis of those cellular transmissions themselves. For example, telematics unit 30 may be used to detect the signal strength of received cellular transmissions and that information may be used alone or in combination with other information concerning the satellite radio broadcast to determine if there is an interruption or other interference with the satellite radio broadcast that should be reported to the remote facility. The cellular chipset 50 can provide this signal strength information that can be supplied to the audio system 36 or other module that is performing the interference detection. The signal strength may be compared to a minimum threshold that is pre-established in or determined by the vehicle electronics. In some embodiments, detection of signal strength above the threshold may be used in conjunction with another measure of interference, such as interruption of the satellite radio content stream or detected interruption of the audible presentation within the vehicle, to determine that there is reportable interference detected.

Another technique for detecting interference with the satellite radio broadcast is to monitor the audible playback of the satellite radio broadcast within the vehicle itself. For example, the vehicle telematics unit 30 and audio system 36 can be used to listen for the satellite radio broadcast within the vehicle 12 using the microphone 32. As the microphone 32 detects audible sound from one or more speakers inside the vehicle, it can also monitor the existence of the audible satellite radio broadcast. For this, the vehicle electronics 28 may be programmed such that, when the satellite radio is currently the selected audio source for the audio player 37, and the volume setting of the audio player is above a minimum volume threshold (e.g., >10 out of a volume range of 0-63), then when the microphone 32 does not detect sound from the audio system speaker (e.g., using a minimum audio threshold), then it can be determined that the satellite radio broadcast is muted (interrupted) because it has been interfered with.

Other techniques for detecting interference with the received satellite radio broadcast due to cellular communication transmissions will become apparent to those skilled in the art.

At step 230, once the interference has been detected, a data message identifying the location of the interference or interruption is transmitted from the vehicle 12 to a remote facility. When the vehicle 12 determines that interference exists, it can record information relating to the interference and transmit a message alerting the remote facility that the interference exists and the location of that interference. The vehicle 12 can identify the location of the interference using the GPS module 40, taking the current vehicle location as indicative of the location at which the interference occurred. The data message can then include the location information, such as by using GPS latitude and longitude coordinates. The data message can also include other information about the interference, such as the time and day that it occurred, what satellite radio channel the audio system 36 had been tuned to, and the length of time the interference, including the location of the vehicle both when the interference was first detected and then when it subsided. After building the data message with the location and other information, the vehicle telematics unit 30 can wirelessly transmit the message to the remote facility via the wireless carrier system 14. This transmission may be done at the time of detection of the interference or held for later transmission, such as at night or in conjunction with another transmission of other information. Examples of the remote facility include the computer 18 and the call center 20, but other implementations are possible.

The remote facility receives the data message from the vehicle 12 and can store the contents of that message with similar content received from other vehicles. As the remote facility receives data messages from other vehicles, it can combine them in one database or data storage facility that is searchable by vehicle service facilities. A vehicle service facility can access the contents of this database from a remote location and transmit location information gathered from a vehicle at the facility. The remote location can search the database to locate instances of satellite radio broadcast interference in the area of the received location information and send information about nearby interferences to the vehicle service facility.

The content of the data messages can be presented to individuals as dots or icons superimposed over geographic maps to graphically identify the location of each instance of satellite radio broadcast interference. The frequency with which these interferences occur can be appreciated by the greater intensity of graphical dots or icons representing the interferences. When viewed from afar, the geographic map rendered on a visual display to include interference events can appear similar to a heat map that indicates the intensity of the interference events. The method 200 then ends.

The steps carried out above may involve additional criteria in determining the existence of interference or whether a report should be made to the remote facility. For example, the process of determining whether a cellular communications signal interferes with a satellite radio broadcast may depend on whether the vehicle is stopped or in motion. For instance, the vehicle 12 may carry out step 220 only when the vehicle 12 is travelling, or is travelling above a particular speed, such as 10 miles per hour (MPH). Other such variations and conditions for operation of the method will become apparent to those skilled in the art.

Furthermore, in carrying out the methods described herein, it will be appreciated that in some implementations, the telematics unit 30, audio system 36, and GPS module 40 can each be separate VSMs, meaning that, whether physically integrated or not, they each include a separate electronic processor as a part of their own circuitry with software such that they are capable of operating at least partially independently of each other.

FIG. 3 depicts a more specific implementation of the method of FIG. 2 for detecting satellite radio broadcast interference at a vehicle. Method 300 is used while the vehicle is in operation travelling along a road. The method utilizes the audio system 36, GPS receiver 40, and telematics unit 30, all of which are separate VSMs. As noted above, the audio system 36 includes its audio player 37 and satellite radio receiver (SRR) 47 or 49, and is installed in the vehicle as a portion of vehicle electronics 28 that are used to carry out vehicle functions, including operation of the vehicle to move along roads. And, as also discussed above, the satellite radio broadcast received by the satellite radio receiver is outputted by the satellite radio receiver as a satellite radio content stream for audible presentation by the audio player via one or more speakers in the vehicle.

Method 300 begins with step 310 at which an audio system 36 is operated using SRR 47 or 49 as a selected audio source. The SRR receives a satellite radio broadcast at the vehicle while the vehicle is moving along a roadway, step 320. At step 330, the audio system 36 audibly presents the satellite radio broadcast in the vehicle as it is received by the SRR. Then, at step 340, the vehicle detects an interference with the satellite radio broadcast caused by cellular communication transmissions that interrupts or degrades the audible presentation of the satellite radio broadcast in the vehicle. In response to this detection of interference, the vehicle at step 350 then obtains current vehicle location information using GPS receiver 40, with this obtained vehicle location being representative of the location at which the interference occurred. And then at step 360, the vehicle wirelessly transmits a message identifying the location at which the interference occurred to a remote facility via the vehicle telematics unit 30.

As indicated in FIG. 3, the determination that the interference occurred is done at least in part by carrying out one or more of the following sub-steps 342-345. Step 342 involves detecting an event indicative of an interruption in the satellite radio content stream that contains the satellite radio broadcast outputted by the satellite radio receiver. Step 343 involves detecting a signal strength of the cellular communication transmissions and determining that the interference occurred at least in part based on the signal strength. Step 344 involves determining a bit error rate (BER) of the received satellite radio broadcast and determining that the interference occurred at least in part based on the BER. And step 345 involves monitoring the audible presentation of the satellite radio broadcast within the vehicle via a microphone and detecting an interruption in the audible presentation based on an analysis of the monitored audible presentation. Detailed methods for carrying out each of these interference detection techniques are described above in connection with FIG. 2.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of detecting satellite radio broadcast interference at a vehicle, comprising:
  (a) operating an audio system installed in the vehicle using a satellite radio receiver as a selected audio source, wherein the audio system includes the satellite radio receiver and is installed in the vehicle as a portion of vehicle electronics that are used to carry out vehicle functions including operation of the vehicle to move along roads;
  (b) receiving a satellite radio broadcast at the vehicle via the satellite radio receiver while the vehicle is moving along a roadway;
  (c) audibly presenting the satellite radio broadcast in the vehicle via the audio system as the satellite radio broadcast is received by the satellite radio receiver;
  (d) detecting an interference with the satellite radio broadcast caused by cellular communication transmissions, wherein the interference interrupts or degrades the audible presentation of the satellite radio broadcast in the vehicle;
  (e) in response to step (d), carrying out the following steps (f) and (g):
  (f) obtaining location information at the vehicle using a global positioning system (GPS) receiver installed onboard the vehicle as a part of the vehicle electronics, wherein the obtained location information is representative of the location at which the interference occurred; and
  (g) wirelessly transmitting a message identifying the location at which the interference occurred to a remote facility via a vehicle telematics unit that is installed in the vehicle as a part of the vehicle electronics;
  wherein the audio system, GPS receiver, and telematics unit are separate vehicle system modules, and wherein the audio system includes the satellite radio receiver and an audio player that is either integrated with or operably connected to the satellite radio receiver, wherein the satellite radio broadcast received by the satellite radio receiver is outputted by the satellite radio receiver as a satellite radio content stream for audible presentation during step (c) by the audio player via one or more speakers in the vehicle; and
  wherein step (d) further comprises determining that the interference occurred at least in part by:
    determining a bit error rate (BER) of the received satellite radio broadcast and determining that the interference occurred at least in part based on the BER, wherein determining the BER further comprises determining that the BER of the satellite radio broadcast is above a predetermined threshold for longer than a determined time, and wherein the predetermined threshold is at least 5% and the determined time is no longer than 10 seconds.

2. The method of claim 1, wherein the cellular communication transmissions are sent within a frequency band used by a cellular sub classification, wherein the sub classification includes Wireless Communication Service (WCS), Advanced Wireless Service (AWS), or Personal Communications Service (PCS), and wherein the satellite radio broadcast is wirelessly transmitted within a 2.3 GHz frequency band.

3. The method of claim 1, wherein step (g) further comprises determining a time and day at which the interference occurred and including the time and day in the message.

4. The method of claim 1, wherein step (d) further comprises determining which satellite radio channel was selected when the interference occurred, and wherein step (g) further comprises including an identification of the selected channel in the message.

5. A method of detecting satellite radio broadcast interference at a vehicle, comprising the steps of:
  (a) receiving a satellite radio broadcast at the vehicle;
  (b) audibly playing the satellite radio broadcast at the vehicle via an audio system;
  (c) determining the bit error rate (BER) of the satellite radio broadcast received at the vehicle;
  (d) detecting that the BER is above a predetermined threshold and, in response thereto:
  (e) obtaining the vehicle's current location; and
  (f) transmitting to a remote facility a message identifying the current location and indicating that there is interference with reception of the satellite radio broadcast;
  wherein step (d) further comprises determining that the BER of the satellite radio broadcast is above the predetermined threshold for longer than a determined time, and wherein the predetermined threshold is at least 5% and the determined time is no longer than 10 seconds.

6. The method of claim 5, wherein the satellite radio broadcast is wirelessly transmitted within a 2.3 GHz frequency band.

7. The method of claim 5, wherein step (f) further comprises determining a time and day at which the interference occurred and including the time and day in the message.

8. The method of claim 5, further comprising, in response to detecting that the BER is above the predetermined threshold, determining which satellite radio channel is currently selected, and wherein step (f) further comprises including an identification of the selected channel in the message.

* * * * *